(12) United States Patent
Chen et al.

(10) Patent No.: US 7,176,796 B2
(45) Date of Patent: Feb. 13, 2007

(54) ANTI-COUNTERFEIT SEALING CAP WITH IDENTIFICATION CAPABILITY

(75) Inventors: Li-Huei Chen, Hsinchu (TW);
Tsung-Ju Gwo, Banchiao (TW);
Feng-Heh Wang, Touliou (TW);
Chien-Ben Chen, Kaoshiung Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 185 days.

(21) Appl. No.: 10/973,952

(22) Filed: Oct. 25, 2004

(65) Prior Publication Data

US 2006/0049948 A1   Mar. 9, 2006

(30) Foreign Application Priority Data

Sep. 6, 2004   (TW) .............................. 93126892 A

(51) Int. Cl.
*G08B 13/14*   (2006.01)
(52) U.S. Cl. ................. 340/568.1; 340/572.1; 340/686.1; 343/873; 215/901
(58) Field of Classification Search ............. 340/568.1, 340/572.1, 686.1; 215/901; 343/873
See application file for complete search history.

(56) References Cited

U.S. PATENT DOCUMENTS 7,061,382 B2 * 6/2006 Claessens et al. ....... 340/572.8
2006/0038683 A1 * 2/2006 Claessens et al. ....... 340/572.1

* cited by examiner

*Primary Examiner*—Jeffery Hofsass
*Assistant Examiner*—Hongmin Fan
(74) *Attorney, Agent, or Firm*—Pro-Techtor Int'l Services

(57) ABSTRACT

A sealing cap with an anti-counterfeit and identification capability comprises a cap body, an identification chip with a signal emitting device generating an identification signal, and a destructive device, characterized in that the cap body is electrically connected with the signal generating device and serves as an antenna of a relatively large area and in that the destructive device after dismounting of the cap destroys the capability to emit radiation and thus prevents said identifying chip from being dismounted and reused.

7 Claims, 2 Drawing Sheets

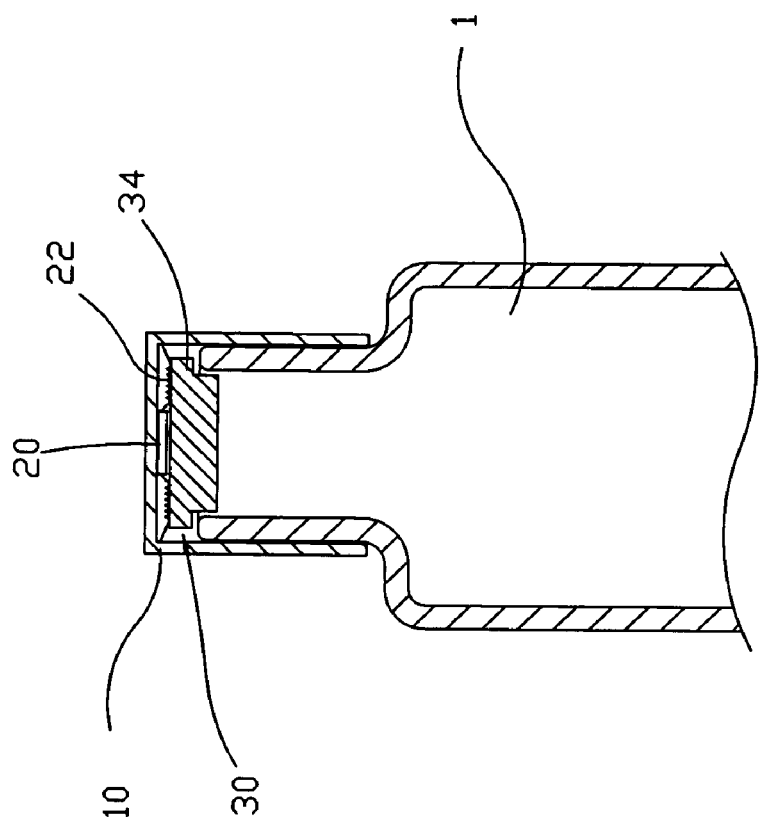
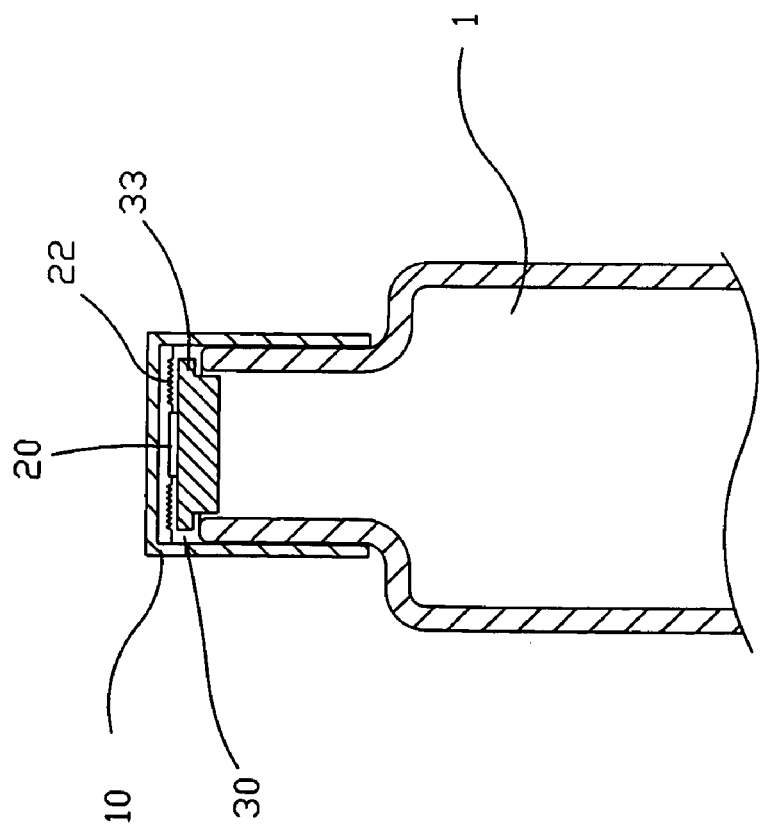

ANTI-COUNTERFEIT SEALING CAP WITH IDENTIFICATION CAPABILITY

BACKGROUND OF THE INVENTION

1. Field of the Invention

The present invention relates to an anti-counterfeit sealing cap with identification capability, particularly to an anti-counterfeit sealing cap with wireless frequency identification capability.

2. Description of Related Art

Spirits, beverages, cosmetics and other valuable liquids need protection against counterfeit and theft during transport. Usually, caps of liquid bottles are equipped with protective measures and techniques, as follows:

1. A protective ring is attached at a lower edge of a cap, which is destroyed upon any attempt to open the bottle, so that unauthorized opening and resealing of the bottle is easily detected, by which the contents thereof may have been exchanged.
2. Characters or drawings are printed on the cap which are invisible under normal light, but visible under ultraviolet light, thus identifying the bottle as a genuine product.
3. Three-dimensional printing and a polishing treatment identify the bottle as a genuine product.

Above conventional protective measures use optical methods or destruction of packaging to recognize counterfeit and protect against unauthorized opening and resealing. However, examining of bottles has to be performed manually, there are no specific product data stored, and bottles have to be examined one by one, resulting in difficulties for mass production and processing of data.

Another conventional protective measure lies in using bar codes to store product data. This method, however, requires a bar code reader, storage space is limited, so that detailed information has to be stored elsewhere, e.g., on a server computer, and are not immediately accessible. Furthermore, reading bar codes requires optical scanning of samples one by one and is therefore not suitable for quick processing of large volumes.

To meet recent demand for high sales volumes, automatization and quick processing of mass-produced items, wireless identification (RFID) techniques have been developed. A wireless identification device mainly comprises a tag, an antenna and a reader. The tag is equipped with a semiconductor chip. Having entered a magnetic field generated by the reader, an electric current is induced, which supplies energy for reading out and sending data stored on the chip. Sent data are received by the reader and transmitted to a central processing system.

Since reading of data is performed without contacting and without wires, large volumes of data are read out fast, making this method suitable for high-volume processing and sales. Large supermarkets, security checkpoints for air and sea freight and customs checkpoints have introduced RFID for faster processing and increased security.

Currently, usage RFID is still in an introductory phase and has so far only partly replaced the usage of bar codes. U.S. Pat. No. 6,226,619 "Method and system for preventing counterfeiting of high price wholesale and retail items" discloses a cap equipped with a semiconductor chip and an antenna. The chip is read out only once and then destroys itself, so that there is only a one-time reading capability, not allowing for repeated reading of data.

However, the antenna of this RFID device has a limited area, which restricts an angle of reading, and the chip is not protected from being dismounted and reinserted in counterfeit products, so that no effective protection against pirating is achieved. Furthermore, the chip is only usable once for reading and uses its readability immediately after that. But for the distribution of goods, reading of information is often required at various stages, which cannot be performed from conventional chips. Therefore, conventional RFID devices still need some improvement.

SUMMARY OF THE INVENTION

It is the main object of the present invention to provide an anti-counterfeit sealing cap with wireless frequency identification capability which has a cap body and a semiconductor identifying chip attached to an inner side thereof, with the cap body acting as an antenna and the identifying chip being automatically destroyed if the cap body is opened.

By the design of the present invention, the cap body as a whole serves as an effective area of the antenna, ensuring a large effective area of the antenna and an unrestricted angle of radiation, increasing detecting sensitivity. Automatic destruction of the identifying chip upon opening of the cap body serves as an effective measure against counterfeiting.

Furthermore, the identifying chip can be read repeatedly without opening the cap, thus being suitable for use in mass production.

The present invention can be more fully understood by reference to the following description and accompanying drawings.

BRIEF DESCRIPTION OF THE DRAWINGS

FIG. 3 is a sectional side view of the anti-counterfeit sealing cap of the present invention in the third embodiment.

FIG. 4 is a sectional side view of the anti-counterfeit sealing cap of the present invention in the fourth embodiment.

DETAILED DESCRIPTION OF THE PREFERRED EMBODIMENTS

Figure 1:
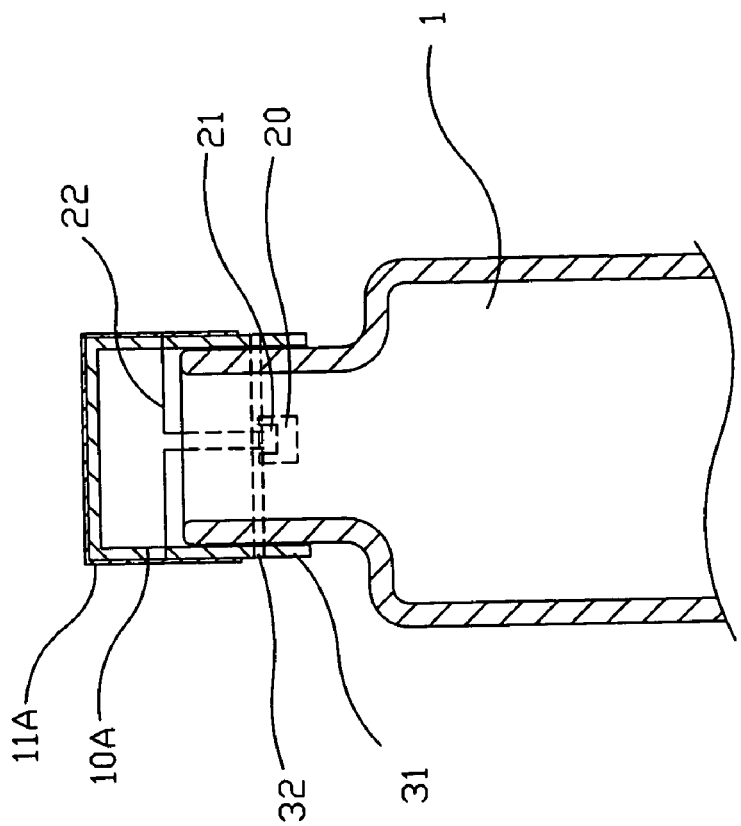
FIG. 1 is a sectional side view of the anti-counterfeit sealing cap of the present invention in the first embodiment.

As shown in FIG. 1, the anti-counterfeit sealing cap with identification capability of the present invention in a first embodiment mainly comprises: a cap body 10, sealing an opening of a container 1 and having a surface; a semiconductor identifying chip 20, attached to an inner side of the cap body 10, storing product data; and a destructing device 30. The identifying chip 20 has a signal emitting device 21. Several connectors 22 connect the signal emitting device 21 and the cap body 10, so that signals generated by the signal emitting device 21 are radiated by the cap body 10 serving as an antenna to a reader in an RFID device for frequency identification. The destructing device 30 is mounted between the cap body 10 and the container 1. Upon opening the cap body 10, the destructing device 30 destroys the capability of the identifying chip 20 to send signals, preventing unauthorized opening and reuse of the cap body 10.

The identifying chip 20 works similarly to conventional RFID semiconductor chips and therefore does not need further explanation.

The main characteristic of the present invention lies in the entire surface of the cap body 10 acting as antenna radiating signals from the identifying chip 20, so that a large effective area of the antenna results and signals from the identifying chip 20 are radiated out with increased intensity and reading sensitivity is enhanced. Thus reading of product data is performed with higher effectivity and higher throughput of read product samples is achievable, while reading errors are reduced.

In the first embodiment shown in FIG. 1, the cap body 10 is made of electrically conductive material, like copper or aluminum, so that the entire surface thereof acts as an antenna. The signal emitting device 21 of the identifying chip 20 and the cap body 10 are connected, so that signals from the identifying chip 20 are radiated by the cap body 10.

Another characteristic of the present invention is the destructing device 30, preventing opening and dismounting of the cap body 10. In the first embodiment, the destructing device 30 has a ring 31 that is separate from the cap body 10, with several connecting elements 32 inserted between the ring 31 and the cap body 10. When the cap body 10 is opened, the connecting elements 32 break, so that the ring 31 and the cap body 10 become separated. At least one part of the identifying chip 20 is connected with the destructing device 30. Upon opening of the cap body 10, the identifying chip 20 is pulled on from opposite sides, so that the identifying chip 20 is mechanically destroyed or the connectors 22 break.

Since the identifying chip 20 is broken by the destructing device 30 when the cap body 10 has been opened, a reader of an RFID device readily notices that opening of the cap body 10 has occurred, so that unauthorized reuse thereof is prevented. Furthermore, the identifying chip can be read repeatedly without opening the cap, thus being suitable for use in mass production.

Figure 2:
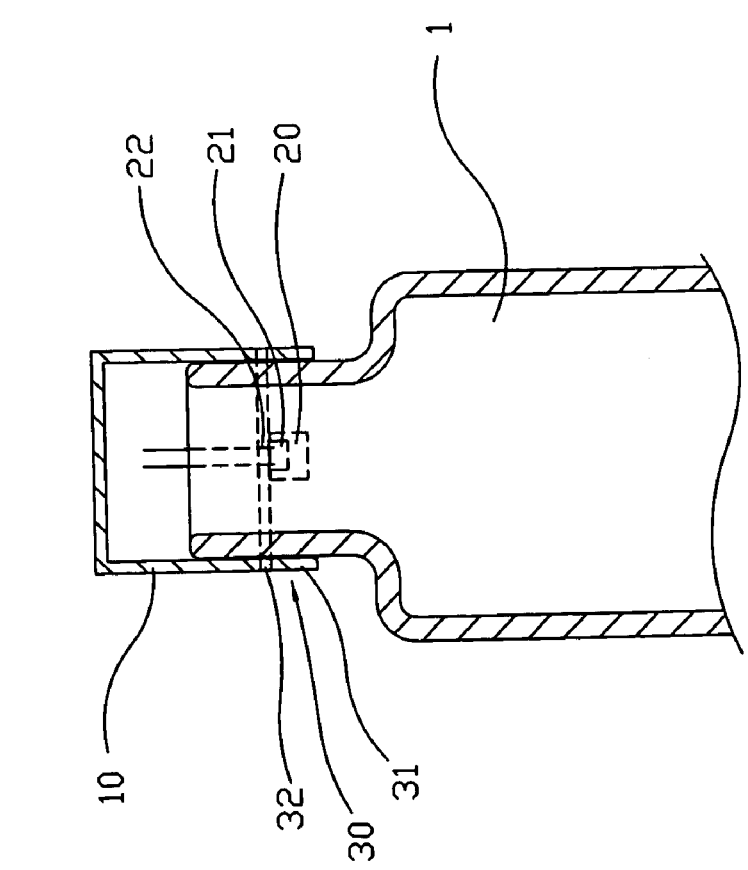
FIG. 2 is a sectional side view of the anti-counterfeit sealing cap of the present invention in the second embodiment.

Referring to FIG. 2, the present invention in a second embodiment has a cap body 10A made of plastics or another electrically non-conductive material. An antenna 11A made of electrically conductive material covers a large part of the cap body 10A. Electrical connection between the signal emitting device 21 of the identifying chip 20 and the antenna 11A is established by the connectors 22. Preferably, the antenna 11A is a metal plate or is printed on the cap body 10A.

In the first and second embodiments, the present invention has antennas of nearly equal areas, resulting in nearly equal signal effectivities. The second embodiment of the present invention, however, due to the applicability of plastic caps allows for a wider range of applications.

Furthermore, as shown in FIG. 3, in a third embodiment of the present invention, the destructing device 30 has a plug 33 sealing the container 1. After removing the cap body 10, the plug 33 is separated therefrom. At least one part of the identifying chip 20 is connected with the plug 33, while via the connectors 22 being connected with the cap body 10 or the antenna. Therefore, when the cap body 10 is removed, the identifying chip 20 is torn apart or the connectors 22 break, eliminating any signal emission capability.

Referring to FIG. 4, in a fourth embodiment of the present invention, the destructing device 30 has a plug 34 which is separate from the cap body 10. In contrast to the third embodiment of the present invention, the identifying chip 20 is mounted on the inner side of the cap body 10 and at least one of the connectors 22 is connected with the plug 34. Therefore, when the cap body 10 is opened, the connectors 22 break, and no transmission of signals from the identifying chip 20 to the cap body 10 is possible anymore.

By the design of the present invention and usage thereof in conjunction with RFID technology, data in high volume are fast and reliably read, and proper identification of product samples is achieved. An increased area of the antenna enhances reading sensitivity and reduces reading errors, and the destructing device 30 ensures that no unauthorized opening and resealing of the cap occurs.

The invention claimed is:

1. An anti-counterfeit sealing cap with identification capability, comprising:
    a cap body, at least partially made of electrically conducting material, with an exterior surface thereof being a receiving and transmitting antenna;
    a semiconductor identifying chip, attached on an inner side of said cap body, storing identification data, generating an identifying signal according to said identification data and being electrically connected with said cap body, so that said cap body radiates said generated identifying signal; and
    a destructing device, preventing said identifying chip from being dismounted and reused;
    wherein said cap body exterior surface radiates said identifying signal generated by said identifying chip, and wherein a destructing device prevents said identifying chip from being dismounted and reused.

2. The anti-counterfeit sealing cap with identification capability according to claim 1, wherein said cap body is made of electrically conducting material.

3. The anti-counterfeit sealing cap with identification capability according to claim 1, wherein said cap body is made of electrically non-conducting material, having a surface covered by an antenna which is made of electrically conducting material.

4. The anti-counterfeit sealing cap with identification capability according to claim 1, wherein said destructing device, upon opening of said cap body, physically destroys electrical connections of said identifying chip, so that emission of said identifying signal is terminated.

5. An anti-counterfeit sealing cap with identification capability, comprising:
    a cap body, at least partially made of electrically conducting material, working as a receiving and transmitting antenna;
    a semiconductor identifying chip, attached on an inner side of said cap body, storing identification data, generating an identifying signal according to said identification data and being electrically connected with said cap body, so that said cap body radiates said generated identifying signal; and further comprising a destructing device which, upon opening of said cap body physically destroys said identifying chip, so that emission of said identifying signal is disabled;

wherein said cap body radiates said identifying signal generated by said identifying chip and where a destructing device prevents said identifying chip from being dismounted and reused; and further wherein said destructing device has a ring, which is separate from said cap body, and at least one connecting element connecting said ring and said cap body, so that, upon opening of said cap body, said identifying chip or said connectors are broken, disabling emission of said identifying signal.

6. The anti-counterfeit sealing cap with identification capability according to claim 5, wherein said destructing device has a plug, which is separate from said cap body, with at least one part of said identifying chip being connected with said plug, so that, upon opening of said cap body, said identifying chip or said connectors are broken, disabling emission of said identifying signal.

7. The anti-counterfeit sealing cap with identification capability according to claim 5, wherein said destructing device has a plug, which is separate from said cap body, with at least one of said connectors connecting said identifying chip and said plug, so that, upon opening of said cap body, said connectors are broken, disabling emission of said identifying signal.

* * * * *